United States Patent [19]

Berg et al.

[11] Patent Number: 5,208,051
[45] Date of Patent: May 4, 1993

[54] HELICAL TOOLING FOR CONSOLIDATION OF THERMOPLASTIC COMPOSITE TUBES

[75] Inventors: Timothy M. Berg, Hudson, Wis.; Timothy G. Gutowski, Newton, Mass.

[73] Assignee: Massachusetts Institute of Technology, Cambridge, Mass.

[21] Appl. No.: 608,303

[22] Filed: Nov. 2, 1990

[51] Int. Cl.⁵ ............................................. B29C 43/02
[52] U.S. Cl. .................................. 425/393; 264/313; 425/403; 425/417; 425/425; 425/426; 425/521
[58] Field of Search ............... 425/111, 112, 117, 518, 425/519, 520, 521, 425, 426, 435, DIG. 7, DIG. 14, 392, 393, 394, 403, 406, 412, 417, 457, 470; 264/257, 258, 313, 317, 319, 324, 325, 339

[56] References Cited

U.S. PATENT DOCUMENTS

3,630,727 12/1971 Rossmann ........................... 264/313

Primary Examiner—Jay H. Woo
Assistant Examiner—James P. Mackey
Attorney, Agent, or Firm—Thomas J. Engellenner; Ralph A. Loren

[57] ABSTRACT

A helical tooling process for economical production of high quality, high temperature thermoplastic composite tubes uses a mandrel or external cylinder to resist a force applied from a helical member for consolidation pressure, compaction, and part removal. The helical too long process facilitates the prescription of a desired consolidation pressure and diameter, independent of temperature. The advantages of the disclosed process include improved produced part quality, increased process flexibility, and enhanced economic efficiency. These advantages stem from the device being easily controlled and fabricated and having a low thermal mass.

8 Claims, 6 Drawing Sheets

HELICAL TOOLING FOR CONSOLIDATION OF THERMOPLASTIC COMPOSITE TUBES

The present invention relates generally to the manufacture of thermoplastic matrix composite tubes. In particular, the invention is concerned with an improved method and apparatus for manufacturing such tubes to high dimensional accuracy without the need for secondary surface finishing operations.

Composite tubes have many important uses including space structures, bearings, airliner ductwork, and flexible drive shafts. Recently, thermoplastic composite matrices have been developed that offer longer shelf life, higher toughness and damage tolerance, better environmental resistance, higher temperature performance, better scrap reclamation possibilities, and potentially faster processing than previously known thermoset matrices. A "composite," as used herein, means and includes laminates of fibers and thermoplastic resins. Useful fiber materials include glass, graphite, carbon, polygranules such as KEVLAR, and polyethylene, as well as other strengthening fibers. As a result, the range of applications for thermoplastic composite matrices in commercial and aerospace industries has increased. Current tube manufacturing methods, however, produce parts with poor surface quality, are prohibitively slow and costly, and do not work well with high temperature thermoplastic resins.

The manufacture of a composite tube is a two step process: fiber placement and consolidation. Fiber placement requires wrapping or winding a composite, such as the thermoplastic filament, into a cylindrical configuration. Typical methods for performing this step are wrapping, braiding, pultrusion, spraying, and filament winding. Consolidation consists of heating and cooling the cylindrically configured fiber and resin under pressure to form the composite. Heating methods include induction, microwave, ultrasonic, resistance, hot jet, laser, autoclave, and plasma, while pressurizing techniques include contact, fiber tension, roller, mold, and vacuum bagging. Important considerations for the finished part are that it has the desired fiber volume fraction, microstructure, dimensional control and surface finish. There are two basic methods by which filament winding and consolidation are carried out: "in-situ" filament winding processes and batch processes.

In-situ filament winding involves single step fiber placement and consolidation. A tow containing fibers and resin is heated, pressed onto a part, and cooled as it is wound. There are many variations of in-situ methods which, since all operations occur simultaneously, are all limited by the slowest operation.

In-situ consolidation schemes involve heating, applying pressure, and cooling the tow as it is wound on. Melted resin can be introduced onto the Part by various methods including heating a preimpregnated or comingled fiber tow with a focused laser or hot gas stream, by resistance heating a fiber resin tow, by spraying a melted powder onto the fibers as they contact the part, or by various other ways. For small diameter parts, consolidation pressure can be provided by fiber tension alone. For larger parts, a wheel or shoe can be pressed against the part at the contact point. Cooling can be accomplished by keeping the wheel or shoe cool. There are many other possibilities for the heating, compacting, and cooling sequence but all suffer the same in-situ processing limitations.

As stated above, the rate at which in-situ Processing can be carried out is limited by the slowest operation. For example, the slowest operation may be the rate at which the resin can be heated without degradation, the rate at which cooling can take place without causing deconsolidation, or the rate at which a roller can be pressed against the cooling part without disturbing the resin. Another disadvantage to in-situ methods is that they are only capable of simple wrap geometries.

In batch processing, fiber placement and consolidation operations are performed separately. A fast winding operation, therefore, can be performed independently of a specialized consolidation operation, resulting in an overall process which is faster than if all steps were performed simultaneously.

Currently, the problems associated with known batch processes are thermal in nature. Controlling the effects on a part of thermal expansion and contraction during consolidation is difficult in batch processing. If expansion of the mandrel around which the fibers are wound is not properly managed, the fibers may be broken under tension. Similarly, fiber buckling can occur upon cooling and contraction. Conversely, if too little pressure is applied to the part before it is cooled below its glass transition or Processing temperature, deconsolidation can occur. While batch processing offers the benefit of fast processing, care must be taken not to damage or introduce undesirable residual stresses into the part.

It is, therefore, an object of the present invention to provide a method and apparatus for economically manufacturing high quality, high temperature thermoplastic composite tubes. It is another object of the present invention to provide such a method and apparatus that exploits thermal mismatch of an inner mandrel to generate consolidation pressure and allow for part removal. Still another object is to facilitate prescription of a desired consolidation pressure and diameter, independent of temperature.

SUMMARY OF THE INVENTION

The problems associated with known methods and apparatus for manufacturing composite tubular parts are greatly relieved by the present invention which utilizes helical tooling methods and apparatus. Helical tooling is a novel molding concept that solves the problems associated with thermal mismatch and provides flexible tooling. The inventive helical tool provides a means for continuous adjustment of the diameter and pressure applied to a part being formed independently of temperature.

The helical tool of the invention includes a strip such as, for example, steel, bent about a cylinder to form a tube mold. Tool diameter and applied pressure are adjusted through torque and axial loads which are applied to the ends of the tool through special gripping arrangements. This tooling concept offers demonstrated advantages in part quality, processing flexibility, and tooling costs.

In one aspect, the invention features an apparatus for applying pressure to form a tube shaped part. The invention includes a helically shaped member which defines at least one substantially smooth cylindrical surface. A force can be applied to the helically shaped member to vary the diameter of at least one cylindrical surface. The tool also includes structure, such as a mandrel or cylinder arranged concentrically with the helically shaped member, for resisting the expansion or contraction of the helically shaped member.

In accordance with the invention, the helical member defines parallel lengthwise edges which are preferably formed for snug engagement with one another. Gasketing is also provided for this seam. In this manner, when the helical member is shaped into a helix, a tight seal is provided along a seam where the lengthwise edges meet. This feature prevents resin leakage during the consolidation stage of part formation.

The helically shaped member can be arranged differently with respect to the structure for resisting the expansion or contraction of the helically shaped member. Each arrangement allows a force to be applied to the helically shaped member so that it transmits a radially projecting compressive force to the composite material for consolidation.

In one arrangement, a composite of fibers and resin, e.g., resin impregnated thermoplastic filament, is wound around a mandrel which is positioned inside of the helically shaped member. A force is then applied to the helically shaped member to decrease the diameter thereof which results in an evenly distributed compressive force being engendered between an outer surface of the mandrel and an inner surface of the helically shaped member.

In another arrangement, the composite is wrapped around the helically shaped member which is then positioned inside a cylinder. In this configuration, a force is applied to the helically shaped member to increase its diameter. This results in an evenly distributed compressive force being engendered between an inner surface of the cylinder within which the helically shaped member is positioned and an outer surface defined by the helically shaped member.

In still another arrangement, the composite is wound around the helically shaped member which is then positioned within a second helically shaped member. A combination of forces is then applied to the helically shaped members to increase the diameter of the first helically shaped member and/or decrease the diameter of the second helically shaped member so that an evenly distributed compressive force is engendered between cylindrical surfaces defined thereby resulting in consolidation of the composite.

In another aspect, the invention features a method for forming a tube shaped part including the steps of defining a cylinder of a composite, e.g., a thermoplastic filament, and arranging a helically shaped member, as set forth above, concentrically with the cylindrically configured composite. The arrangement of the helically shaped member with respect to the cylindrically configured composite will determine the manner in which the force needs to be applied to the helically shaped member for consolidation.

The present invention offers unique processing capabilities and flexibility. Tool diameter and applied pressure are continuously adjustable independent of temperature. The helical tooling process can consolidate braided, wound, or wrapped tubes. Helical tooling allows process monitoring and lends itself to automatic control.

In accordance with the invention, applied pressure or desired diameter are continuously adjustable, so that a known pressure profile can be applied through the heating and cooling cycles by varying the applied torque. Since the helical tool has uniform thickness, the diameter and compaction of the composite part can be measured directly during processing.

Another advantage of the invention is that part loading and removal are fast and easy. A novel open end gripping arrangement facilitates enlarging the mold opening without interference which allows parts to be engaged and disengaged quickly. If part sticking occurs, the helical tool can be torqued open to break the part free.

The helical tool has low thermal mass, allowing fast cycle times with low energy requirements. In certain embodiments, the helical tool, composite part, and mandrel can be heated to 625° F. in under fifteen minutes by two 600 watt heating tapes. This short period and low energy requirements help make helical tooling an economical process.

The use of cylindrical mold surfaces allows the surface quality and dimensional uniformity on both the inside and outside of a part to be precisely specified. The flexibility of the outer mold surface allows control of the residual stress state of the finished part.

In conventional in-situ and wet filament winding processes, unless a separate finishing operation is performed, the part is left with a coarse outer surface finish. When, on the other hand, consolidation is performed with the disclosed helical tool, the part takes on the qualities of the mold surfaces. Accordingly, the mandrel and helical tool may be polished to give the parts excellent surface finish.

The stress state in which the consolidation process leaves the part can be manipulated with helical tooling. To alleviate fiber buckling, less pressure can be applied from the outside via the helix. If fiber breakage is the problem, mandrel expansion can be controlled by using a material with a smaller thermal expansion. It may also be desirable to produce tubes that are prestressed to allow greater reverse loadings. Helical tooling gives flexibility in controlling residual stresses.

There are several advantages to the present invention's separation of the steps involved in the manufacture of composite parts. First, since fiber placement is performed independently of consolidation, it can be done quickly by the most appropriate method, such as filament winding, roll wrapping, braiding, etc. Then, utilizing the helical tool for consolidation results in a fast overall process. In this manner, processing with helical tooling allows operation specialization.

Additionally, separating the tasks in the manufacturing process limits the liabilities of process difficulties. While a breakdown in one subsystem of an in-situ process cripples the entire operation, the operation independence of helical tooling processing buffers large down times from small disturbances.

Still another advantage of helical tooling is that the apparatus costs are small. The most complicated component is the helically shaped member which as experience has shown, can for most applications be machined, bent, honed, and prepared for the grippers by a machinist in less than a day. As a result, helical tooling is a simple, economical molding process.

These and other features and objects of the present invention will be more fully appreciated by reference to the following detailed description, and accompanying drawing, in which like reference numerals refer to like elements throughout the several views.

DETAILED DESCRIPTION OF PREFERRED EMBODIMENTS

In its broadest aspects, the present invention features a method and apparatus for applying pressure to form a tube shaped part. The apparatus of the invention includes a helical tool formed of a strip of material wrapped in a helix to define a diameter, and a structure for imparting a force to the strip to alter the diameter. There is also a structure for resisting the force applied by the change in diameter, applying a net pressure to a Part held between the helix and the resisting structure.

For a clear understanding of the tool, the main element of which is the force transmitting helix, it is first necessary to understand the basic geometric properties of a helix. One important feature of a helix is that the product of its principal curvatures (or its Gaussian curvature), is zero, i.e. that it is a developable surface. This means that the helix can be formed from a flat strip without stretching or tearing and that a given strip can be formed into perfect cylindrical helices of any diameter, within the limits of the strip's length.

Figure 1A:
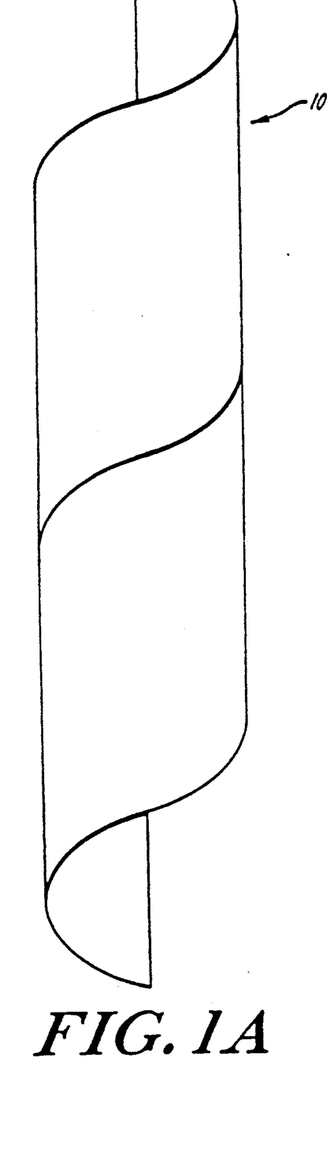
FIG. 1A is a representation of a helix wound strip.
Figure 1B:
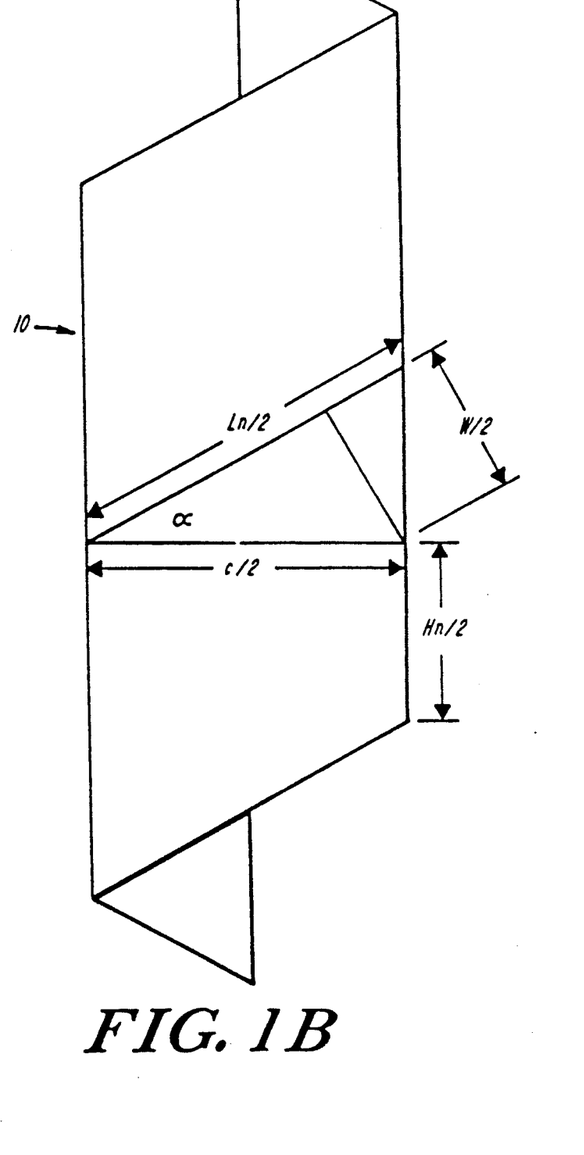
FIG. 1B is a representation of a flattened version of the helix of FIG. 1A.
Figure 1C:
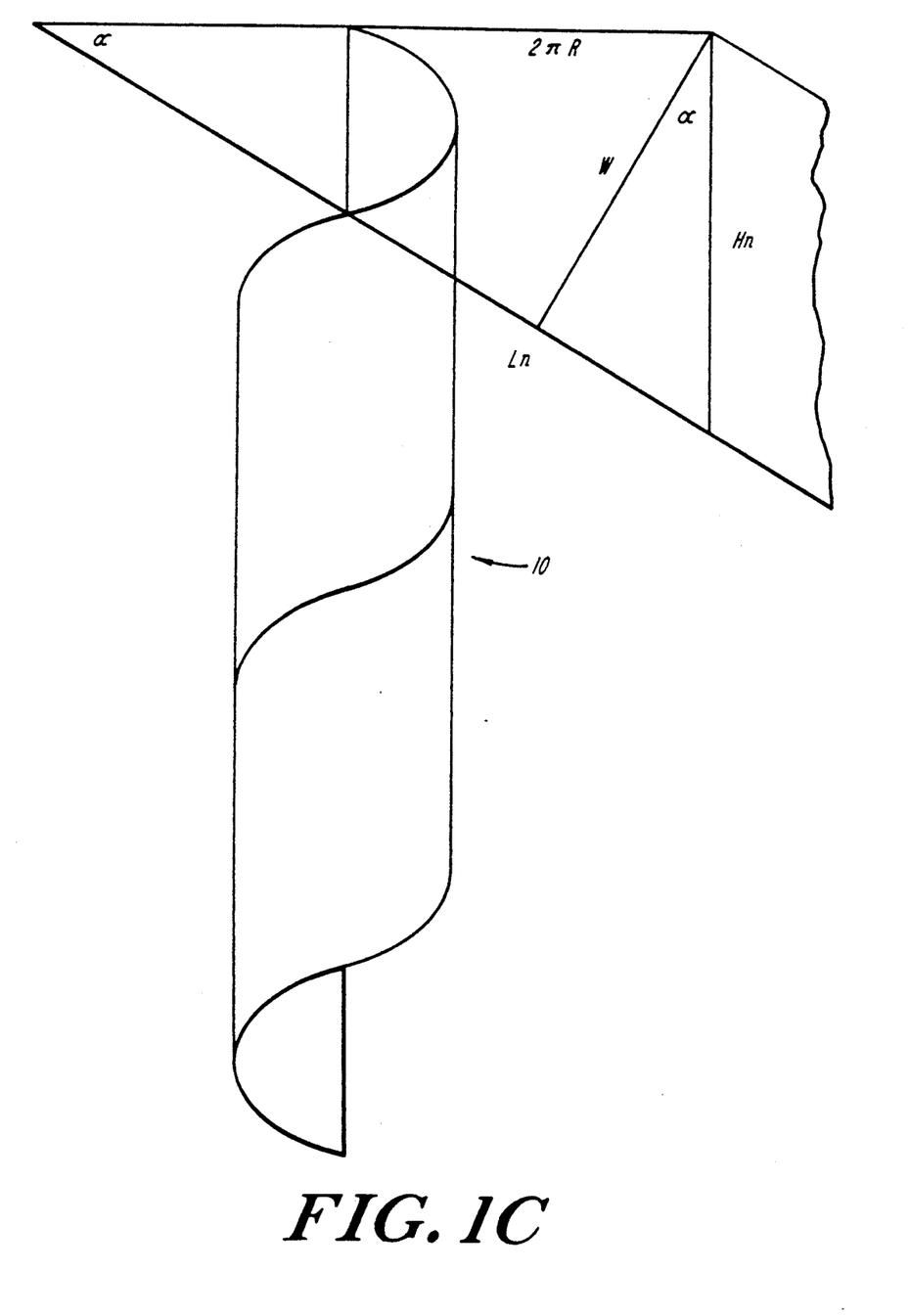
FIG. 1C is a representation of a portion of an unrolled helix in relation to the helix of FIG. 1A.

A helix can be described by the properties of radius, angle, effective length, angle swept, height, and strip width. These properties are most easily envisioned by flattening or unrolling a helix onto a plane. FIG. 1A is a schematic representation of a helix 10 which will be used to demonstrate these properties. FIG. 1B shows the helix 10 in its flattened state and FIG. 1C shows a portion of the helix 10 in its unrolled state.

The width, w, of a strip needed to produce a helix having a given angle, $\alpha$, and radius, R, can be determined from the following equation:

$$w = 2\pi R \sin \alpha.$$

Similarly, the length of strip required for each helical wrap, $L_n$, of a given radius or wrap height, $H_n$, is:

$$L_n = \frac{2\pi R}{\cos \alpha} \text{ or } \frac{H_n}{\sin \alpha}$$

Figure 2:
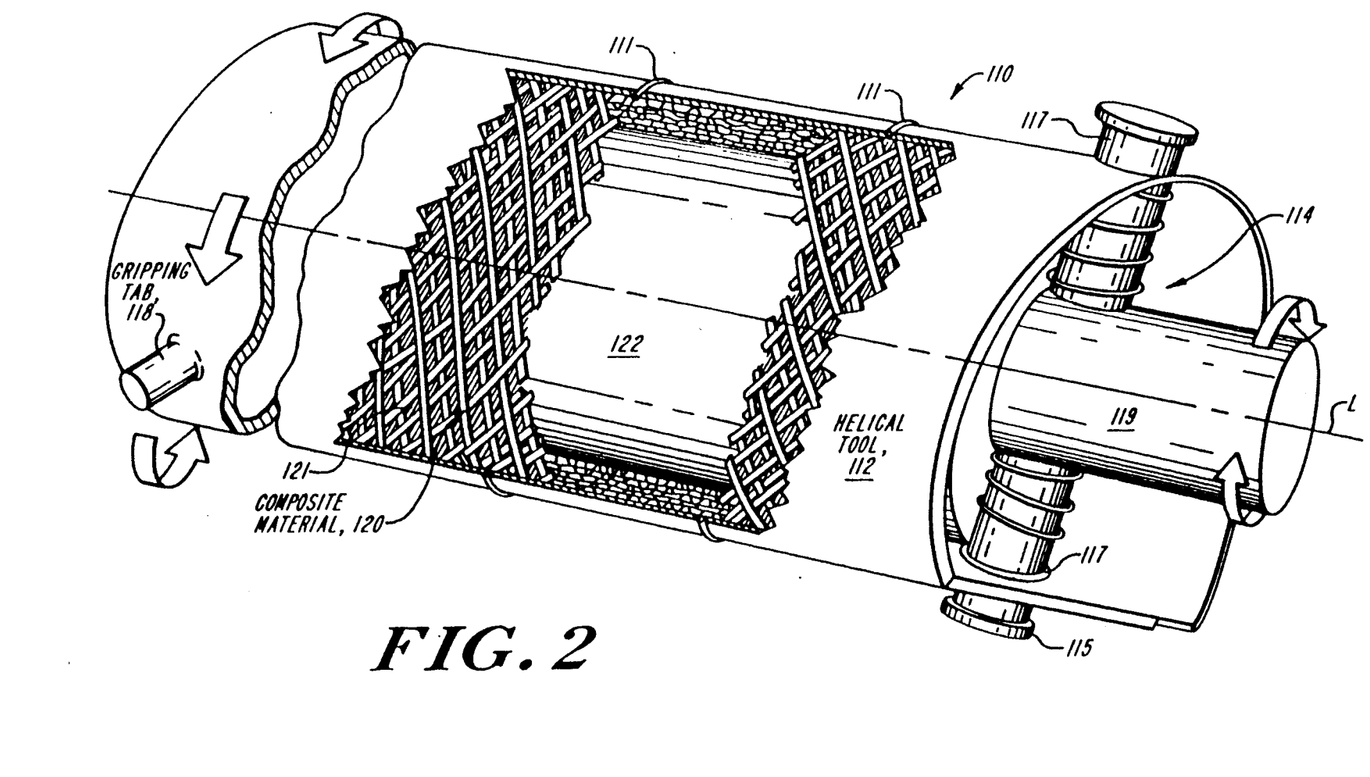
FIG. 2 is a partially cut away depiction of an illustrative helical tool constructed in accordance with the teachings of the present invention.

FIG. 2 shows an illustrative helical tool 110 constructed in accordance with the present invention. The helical tool 110 includes a helix 112 formed, for example, from a strip of steel, and first and second force applicators 114 and 118. The helix 112 is displaced about a mandrel 122 around which is wrapped a composite such as a thermoplastic filament 120. The mandrel 122 may also have a resin 121 added among the interstices of filament 120. Positioned as such, filament 120 is ready for the consolidation stage of the tube forming process.

The helix 112 has a longitudinal axis L. It should be understood that while the helical tool 110 is shown with first and second force applicators 114 and 118, only one force applicator is necessary for most applications. In FIG. 2, however, both force applicators are shown for the purpose of illustrating the differences between two different types of applicators.

Figure 3:
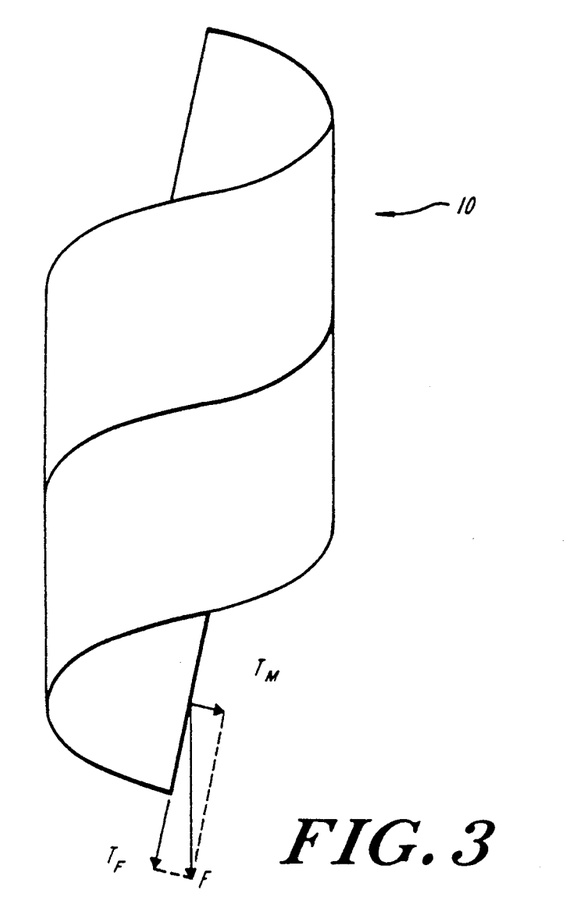
FIG. 3 is a schematic representation of the effect of a force and its components being applied to the helix of FIG. 1.

FIG. 3 is a schematic representation of the forces that can be applied to a helical tool such as the helical tool 110 shown in FIG. 2. By applying a force to a helix 10 in the direction of arrow F, a thrust force component is applied in the direction of arrow $T_f$ and a twisting force component is applied in the direction of arrow $T_m$. Of course, in the case of the helical tool 110 it is possible to apply one of these component forces directly by appropriately manipulating one or both of the force applicators 114 and 118. The operation of these force applicators 114, 118 is more fully discussed herein below. In any event, it is the application of one or a combination of these forces that increases or decreases the diameter of the helix 112. The net result of this operation is to consolidate or expand the helix 112, thereby applying a pressure against the composite material which has been placed between the surface of the helix 112 and mandrel 122.

Applying a force to the helical tool 110 is complex. The ideal force applicator should apply loads uniformly and axially, provide no stress concentrations and account for changes in angle, length, and diameter. It is also important that the force applicator arrangement causes no interference with the loading and unloading of parts. With the perfect force applicator, the helical tool can be set and held at the desired diameter.

As noted, FIG. 2 illustrates two different force applicators. The first force applicator 114 consists of a rod 115 running through two holes 117 in opposite sides of the helical tool. Rod 115 is connected to a shaft 119. By applying axial load and/or torque to the shaft 119, the desired displacement of the helix 110 is achieved. Preferably, holes 117 are drilled one fourth of a strip width in from the edge of a strip to maintain the rod 115 on a diameter perpendicular to the helical tool axis. This is because with each complete wrap of the strip, the strip shifts one full strip width so that the holes 117, which are one half a wrap apart, must compensate for one half a strip width.

Force applicator 114 allows load, torque and displacement to be applied axially. Since the rod 115 runs along the helical tool diameter, the applied load is axially symmetric. A similar situation holds for applying torque. If the rod 115 is made slightly undersized, small changes in diameter and angle may be tolerated.

While force applicator 114 is well suited for applications in which small changes in tool diameter will be experienced, it is not preferred for applications involving large changes in the helical tool angle, diameter, and length. This is because for large increases in tool diameter, rod 115 ceases to run along a diameter and becomes a chord.

A second design of a force applicator is shown as force applicator 118. This is well suited for applications involving large changes in the helix diameter and employs a tab welded to the outside of the helix 112. In contrast to the first force applicator 114 the second force applicator 118 can account for large angle and diameter changes. It also allows for unobstructed part loading and removal.

Tab 118 always stays perpendicular to the cylindrical surface of the helix 112, rotating about an axis perpendicular to the surface as the helical tool angle and diameter change. Theoretically, any change in angle and diameter can be tolerated. Length changes can also be accounted for since there is no rod to cause interference with the mandrel.

Figure 4:
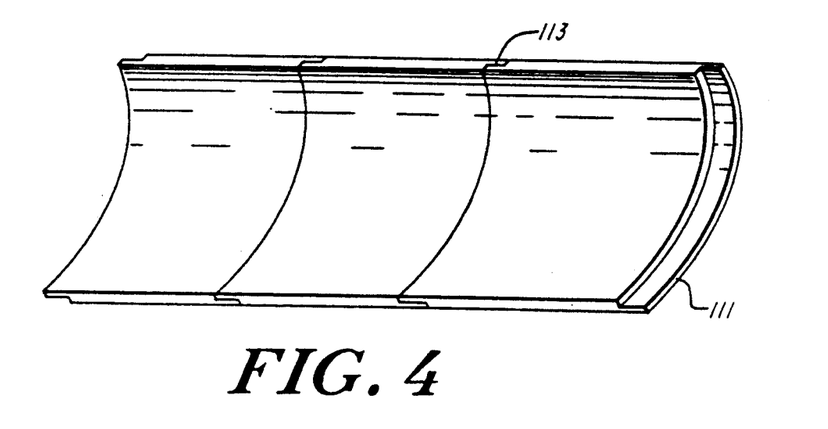
FIG. 4 is a depiction of a portion of successive wraps of the helical tool shown in FIG. 2.

It is another important characteristic of the present invention that resin seepage between successive wraps of the helix 112 is prevented during part consolidation. That is, the lengthwise edges of the helix 112 are formed to provide an effective seal so that when pressure is applied to the composite material, the resin will not be able to seep between successive helical wraps. Leakage is prevented by machining and gasketing the parting line 111 such as shown in FIG. 4, forming a simple, self-aligning matched edge profile 111 that accepts an easily made, high temperature gasket 113. Of course, other edge profiles and gasket arrangements will be readily apparent to those skilled in the art.

Figure 5A:
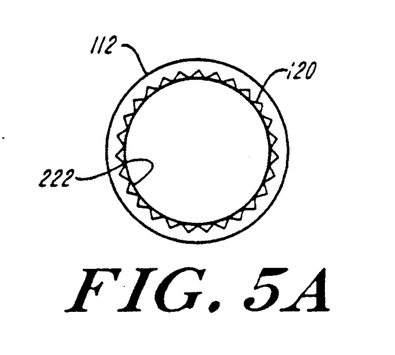
FIGS. 5A through 5C are end views of possible arrangements for a helical tool constructed in accordance with the teachings of the present invention.
Figure 5B:
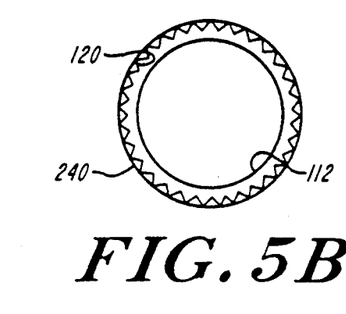
Figure 5C:
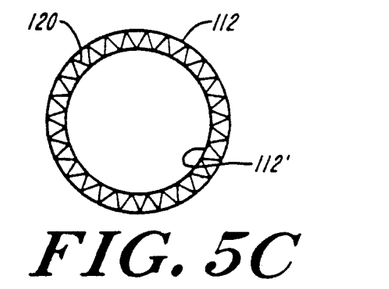

FIGS. 5A through 5C show a variety of ways a helical tool can be used to apply pressure to a composite part for consolidation. In FIG. 5A, a composite 120 is wrapped around a mandrel 222 which is positioned inside a helical tool helix 112. By applying a force to decrease the diameter of the helical tool 112, a compressive force is engendered between the mandrel 222 and the helix tool 112.

In the arrangement shown in FIG. 5B, the helix 112 is positioned inside of a tubular member 240. By applying a force to increase the diameter of the helix 112, a compressive force is engendered for consolidation of the composite 120 and between the cylinder 240 and the helix 112. In FIG. 5C, a second helical tool helix 112' is shown positioned inside of the helix 112 so that a combination of forces can be applied to increase the diameter of the helix 112' and/or decrease the diameter of the helix 112 to thereby transmit a consolidation force to the composite 120.

Figure 6:
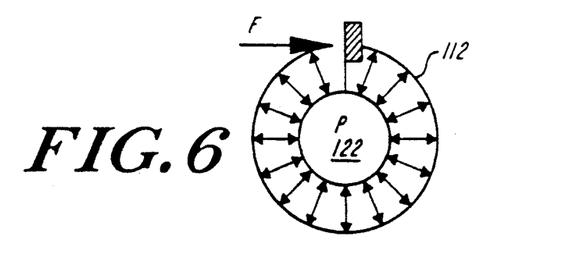
FIG. 6 is a force diagram of the force transmitted to a mandrel by a helical tool to which a force is applied.

The consolidation pressure applied to a part by torquing the helical tool can be roughly estimated by considering a pressurized, thin walled, longitudinally split tube as shown in FIG. 6. This can be thought of as one wrap of a helix where the helix angle is neglected. The torque required to generate a given pressure will be the torque required to move the helix into contact with the part plus the torque required to generate the desired pressure.

The relationship between the pressure applied to the part and the torque applied to the tool is directly proportional. No pressure is generated until the helix makes firm contact with the filament wrapped mandrel. After contact, for an infinitely stiff mandrel, the pressure rises according to the equation:

$$T_p = R^2 w P$$

where $T_p$ is the torque applied to the helix,
R is the helix radius,
w is the width of a strip of the helix, and
P is pressure.

Note, however, that the helix 12 has a "rest" diameter which it will maintain when uninfluenced by outside forces. If the mandrel is larger than this rest diameter, the helix applies pressure to the mandrel even when no torque is applied to the helical tool. In that case, the relationship between the force applied to the tool and the pressure transmitted to the filament will be correspondingly shifted. This results in higher applied pressure levels.

The axial stiffness, torsional stiffness, and coupling relations for a sample group of helical tools have been experimentally determined. Provision was made for applying known, constant axial loads and torques independently and simultaneously through a system of weights and pulleys. The axial and angular deflections corresponding to the applied loads were read using carefully machined dial indicator and protractor arrangements. To minimize the effects of friction, the loads were applied to open and extend the helix, so there would be no rubbing of wraps against each other. To insure that the stiffness of the helix would be the same in extension and compression, an open angle helix was tested both ways.

The amount of pressure applied by the helical tool when loaded by a torque was estimated using a resistive polymer pressure sensor. The sensor consisted of a thin sheet of a polymer, the resistance of which changed orders of magnitude at low pressures. The sensor was calibrated and placed between the helix and an acrylic mandrel, at the end of the helix but near the edge of an active wrap. Various torques were applied and the corresponding pressures calculated from the resistance of the sensor.

The onset of yielding was determined by observing a measure of plastic deformation. After each load was applied, in either tension or torsion, the helix was unloaded and observed. The amount of nonreturn or plastic deformation could be determined.

Figure 7:
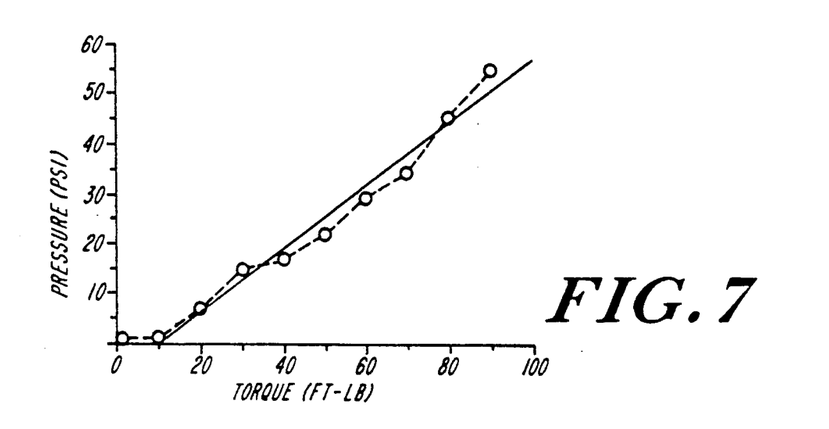
FIG. 7 is a graph of the relationship between torque applied to a sample helical tool and pressure generated by the tool.

The experimental data, shown graph form in FIG. 7, shows the expected pressure profile generated by applying a torque to the helical tool of the invention. The actual pressure profile, as expected, is flat at first (noncontact) and then slopes upward fairly linearly Since the helix is clamped down on a stiff mandrel, the corner region is abrupt.

Issues associated with manufacturing a helical tool in accordance with the present invention include the procedure used to bend the tooling, the bend radius and how it can be minimized, the springback factor, and the anticlastic distortion of the cross-section. Design issues include means for applying force to the end of the tooling, as discussed above, the ranges of diameter and length which can be accommodated, and the effects of use temperature on part integrity.

Figure 8:
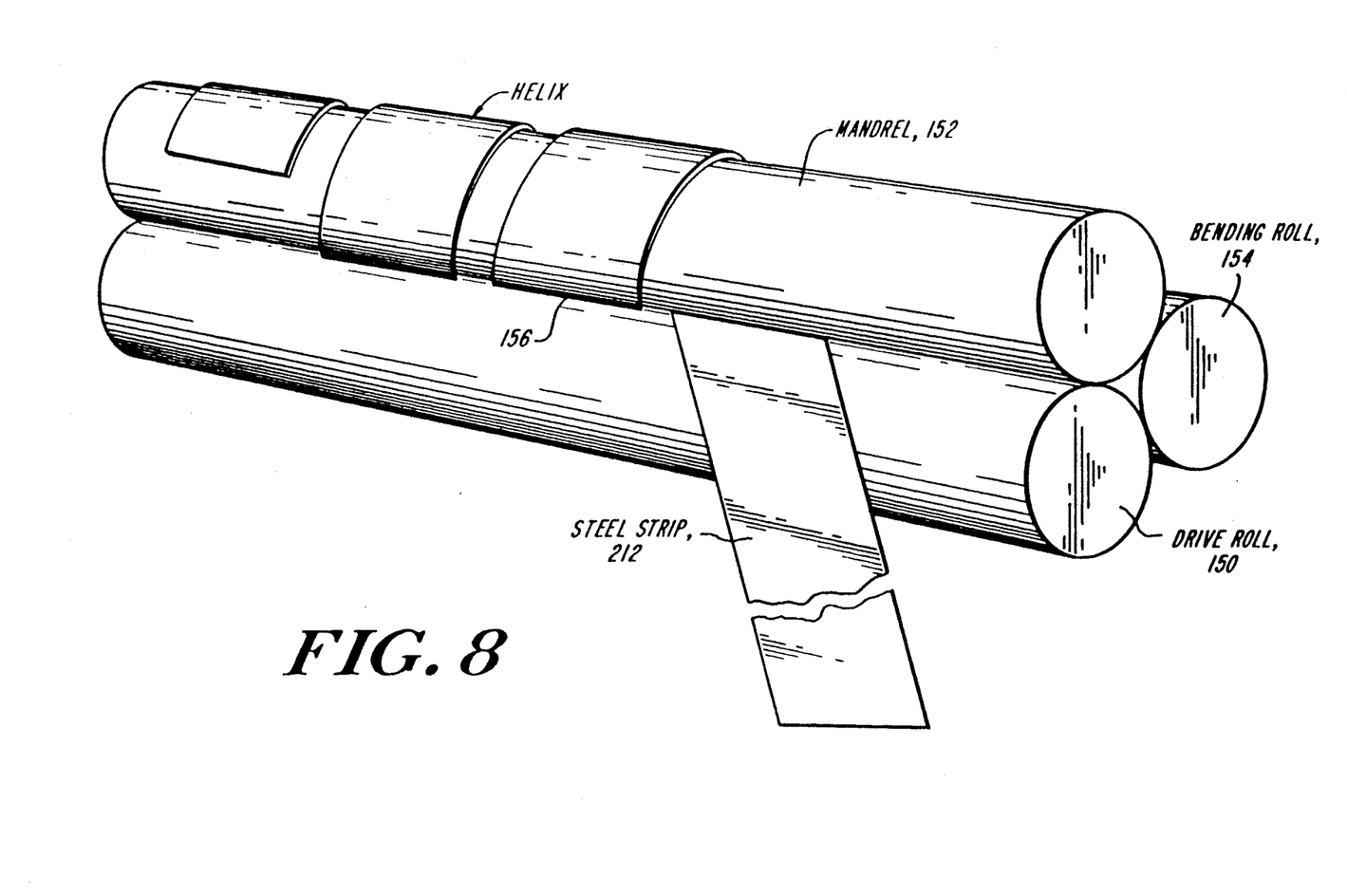
FIG. 8 is a depiction of a helix being formed on a three roll bending apparatus.

The helical tool of the invention can be made on a standard three roll bending machine, as shown in FIG. 8, which consists of a drive or feed roll 150, a mandrel 152, and a bending roll 154. The strip of material 212, e.g., steel, which forms the helically shaped member is fed in between the drive roll 150 and mandrel 152 and driven by friction. The strip 212 then contacts the bending roll 154 and is bent toward the mandrel 152. The strip 212 is fed in at an angle and allowed to wrap around the mandrel 152 and fed back in again as at 156. Several details about this general method of bending should be considered.

The most difficult aspect of the manufacturing operation is starting the material into the three roll bender at the proper angle. To aid this step, the end of a strip 212 is trimmed to match the expected angle $\alpha$ of the final helix 112. This helps guide the material in at the proper angle and prevents bunching up when the strip 212 contacts the bending roll 154. Even with trimming the end, however, achieving the perfect angle initially is difficult, since the strip cannot be controlled well during the start of bending. Alignment can be controlled more easily once the rolling is started, and will be controlled better during starting if a suitable guide is used.

Once the strip 212 contacts the bending roll 154, it must be bent very sharply to near the radius of the mandrel 152. Experience shows that the closer a strip is formed to have a radius similar to that of the mandrel 152, the better uniformity the helix shows from wrap to wrap. A two step bending process should be used to accomplish the initial sharp bend. First, the bending roll 154 is positioned away from the mandrel 152 to allow starting the bend. After the strip 212 just starts a graceful bend, the drive roll 150 is stopped and the bending roll 154 is repositioned. The bending roll 154 is aligned a distance of about one strip thickness away from the mandrel 152 by using test pieces, trimmed from the strip and deburred, at each end. During this repositioning, the end of the strip 212 is pressed against the mandrel 152. The drive roll 150 is then restarted and the strip 212 fed in as at 156. The second and succeeding wraps are aligned with the preceding wraps as the material feeds in. Any slight misalignments can be corrected in the final step.

Once the whole strip 212 has been fed onto the mandrel 152 to form the helix 112, rolling is continued to remove any small nonuniformities. Rolling the helix 112 in the reverse direction from which it was bent tends to pull the wraps close together and smooth the diameter. The end of the mandrel 152 is then released and the helix 112 taken off and a force application structure such as, for example, force applicator 114 or 118, is added to the helix 112 after formation.

Another consideration associated with the helical tool of the present invention is the tool's minimum bend radius (MBR). The minimum bend radius is the smallest radius to which the strip 212 can be bent to form the helix 112 before cracking is observed at the outer fibers of the helix 112. Experimentation has shown that MBR at room temperature is related to the thickness of the material as follows.

MBR for soft steel = 0.5 × thickness

MBR for hard steel = 6.0 × thickness

So, for example, a helical tool utilizing a helix having a thickness of 0.10 inches, will have an MBR of approximately 0.6 inches.

Several factors should be understood to maximize the ability to bend a strip into a helix having a smaller diameter. As the length of the bend increases, so does the minimum bend radius. The length of the bend corresponds to the width of the strip, or more accurately, to the height of one wrap since bending occurs about the helix's longitudinal axis. The largest minimum bend radius occurs for bend lengths ten or more times the thickness, at which point a plane strain condition exists. The decrease in ductility is related to the biaxial stress state that causes anticlastic curvature of the section. The biaxial stresses are largest at the edges for narrow strips and at the center for wider strips allowing prediction of the location of cracking. If a strip is formed by being sheared from a larger sheet, the resulting cold worked edges should be annealed or machined off to reduce edge cracking during bending. Since they are a source of stress concentrations rough edges should be removed. Also, a strip sheared from a sheet should be taken in the rolled direction since transverse ductility is much lower. Finally, the minimum bend radius can be enhanced by applying compression to the region of bending to offset the peak tensile stresses Another feature which should be considered when bending a helix for use with a helical tool in accordance with the present invention is the bend allowance that is required to account for the elastic recovery of the strip during bending There is a disagreement between theory and experience in this area which stems from the operation of forming the helix being not simple bending, but compressive and repeated bending. Large friction forces are required when feeding the strip in because the deformations are so large and are achieved by compressing the strip between the feed and mandrel rolls.

Another phenomenon which must be confronted during forming of the helical strip is the anticlastic distortion of the cross-section In beams, for example, where the aspect ratio is near unity, the curvature of the section is orthogonal to the principal curvature of the strip and is given by the expression:

$$\frac{1}{R_{transverse}} = \frac{v}{R}$$

where $v$ is Poisson's ratio, and $R$ is the helix radius.

As the aspect ratio ($w^2/(Rt)$) (where w is the width of a strip of the helix, R is the helix radius, and t is the thickness of a strip of the helix) becomes larger, the anticlastic curvature of the section is neutralized through the middle of the cross section and approaches a maximum at the edges. For values of $w^2/(Rt)$ greater than about one hundred, the section is flat except at the edges where the maximum deflections approach 0.1 t.

Six helices with the same diameter and thickness but with different aspect ratios were fabricated. The strips had widths ranging from one inch to two and one half inches, representing $w^2/(Rt)$ ratios of from 6.7 to 16.7, respectively. All of these cross sections fall within the ambiguous range that is neither purely beam nor purely plate. Two departures from the pure bending expectations were noticed. The anticlastic curvature was less and neutralization through the central region of the cross sections occurred for sections where the ratio $w^2/(Rt)$ was 13.3 and larger instead of one hundred as predicted by the theory. This is related to the previously mentioned compression of the cross-section during bending. Increasing the compression did not strictly reduce the anticlastic curvature, however. The gap between the feed roll and the mandrel roll was decreased during the final rolling of a one inch wide strip, increasing the compression of the thickness, but the anticlastic curvature increased at the edges.

Several other fabrication methods, such as laser machining and electrodischarge machining, are suitable for forming a helically shaped strip as discussed above. While these methods offer the advantage of greater dimensional uniformity, since they start with a precision tube, they are encumbered by greatly increased cost and an inability to control the edge profile which is important in preventing resin flow.

Two important improvements afforded by the helical tool 110 are the elimination of part diameter variations caused by anticlastic curvature and improvement of part surface quality. By honing the diameter of the tool 110 after bending, both size uniformity and surface quality can be improved. Surface quality alone can be improved by prepolishing the strip 212 and using high quality three roll bender rolls with a surface coating for formation of the helical strip 112.

The minimum diameter for which helical tooling is feasible is determined by practical issues in gripping a small helical tool and the maximum attainable diameter depends on the ability to apply large torques to a large diameter tool. The minimum length of helical tool that can be used is also limited by end effects. In helical tools of three wraps or less, the effects of the force applicators can become significant, since most of the part being formed is processed in the transition region where the wraps are only partly loaded by internal pressure. The end wraps tend to bunch up and cause diameter variations. By adding only a few more wraps, however, this effect is greatly diminished.

If no friction were present between the helical tool and mandrel or part and between successive wrap edges, an infinite number of wraps could be added. Friction, however, prevents the uniform application of pressure for very long helical tools. A friction reduction scheme, such as ultrasonic vibration and lubrication may increase the maximum length attainable. Experience has shown that helical tools having seven and one half wraps function effectively with little diameter variation.

During use for composite part formation, the helical tool will be subjected to thermal cycles involving temperatures of up to 800° F. for periods of up to thirty minutes. It is important to understand, then, that at elevated temperatures, strength and stiffness decrease while ductility tends to increase. For example, the shear modulus of carbon steels decreases about thirteen percent upon heating from room temperature to 700° F.

This temperature cycle may act as a low temperature annealing cycle, thereby relieving the stresses introduced during the cold forming of the helical tool, reducing the yield strength of the tool, and improving ductility The stiffness of the helical tool will not be affected by either cold working or annealing.

It should be understood that the above description pertains to only a few of the several embodiments of the present invention and that various other altercations will be readily apparent to those skilled in the art. The description is intended, therefore, as illustrative rather than limiting. Accordingly, the invention is to be described, not by the preceeding description, but by the claims that follow.

What is claimed is:

1. An apparatus for applying pressure to form a tube shaped part, the apparatus comprising:
    a helically shaped member defining at least one substantially smooth cylindrical surface about a longitudinal axis,
    means, coupled to the helically shaped member, for applying a force to said helically shaped member to cause the diameter of said at least one cylindrical surface to change, and
    means, opposite said cylindrical surface, for resisting the change in diameter of said cylindrical surface.

2. An apparatus as set forth in claim 1 wherein said means for applying a force to said helically shaped member includes,
    means for applying a twist force to said member, and
    means for applying a thrust force to said member.

3. An apparatus as set forth in claim 1 wherein said member is an elongate strip defining opposed lengthwise parallel edges.

4. An apparatus as set forth in claim 3 wherein said opposed edges are formed to engage one another so that a tight seal is provided along a seam where said edges meet when said member is helically shaped.

5. An apparatus as set forth in claim 1 wherein said helically shaped member defines substantially smooth inner and outer concentric cylindrical surfaces.

6. An apparatus as set forth in claim 1 wherein said means for resisting the change in diameter of said cylindrical surface is a mandrel, said mandrel being positioned within said helically shaped member.

7. An apparatus as set forth in claim 1 wherein said means for resisting the change in diameter of said cylindrical surface is a tubular member, said helically shaped member being positioned within said tubular member.

8. An apparatus as set forth in claim 5 wherein said means for resisting the change in diameter of said cylindrical surface is a second helically shaped member, said second helically shaped member being positioned within said first helically shaped member.

* * * * *